Figure 1:
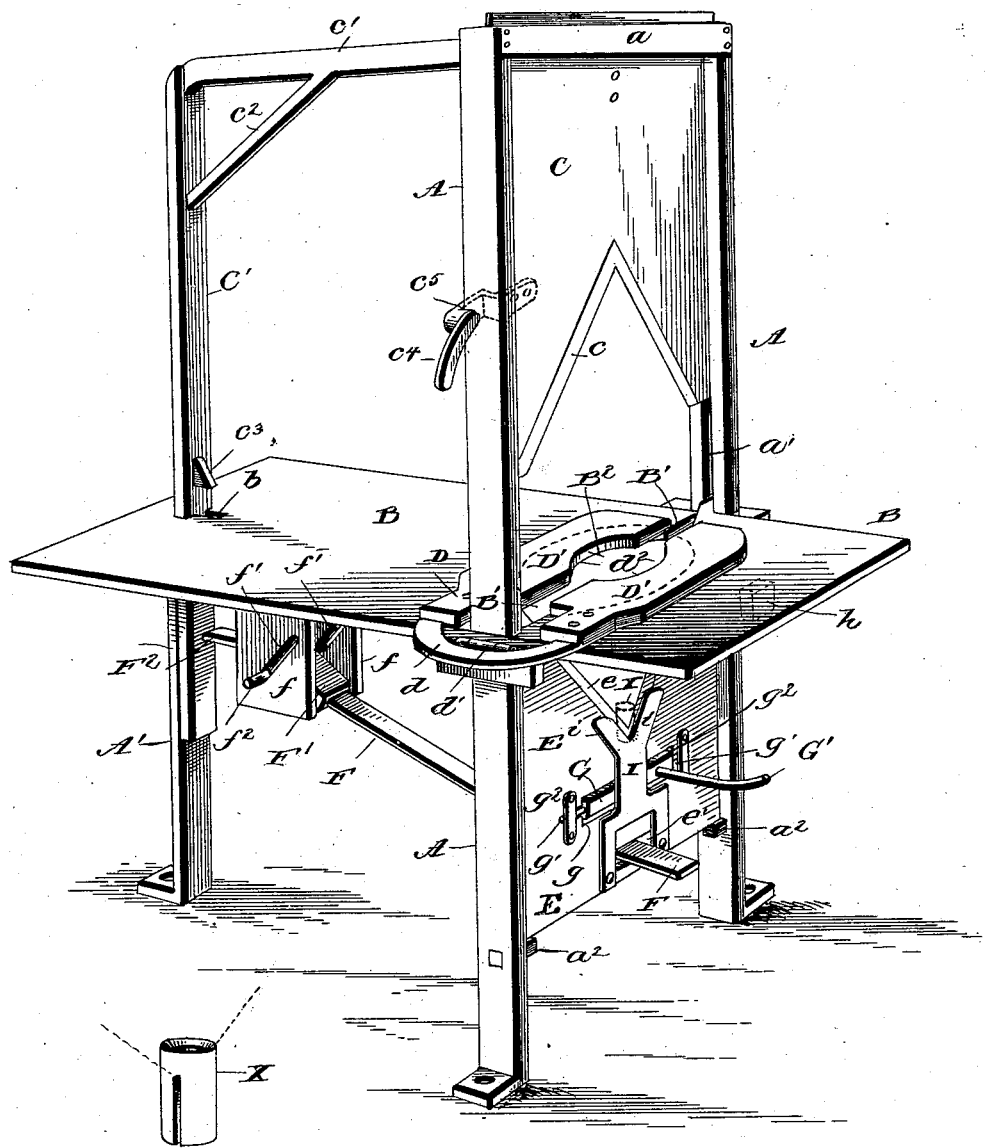

(No Model.)  2 Sheets—Sheet 1.

F. C. STANIFORD.
FRUIT PITTING MACHINE.

No. 522,627.  Patented July 10, 1894.

Witnesses:
L. C. Hill
E. H. Bond

Inventor:
Frank C. Staniford
by E. B. Stocking
Attorney

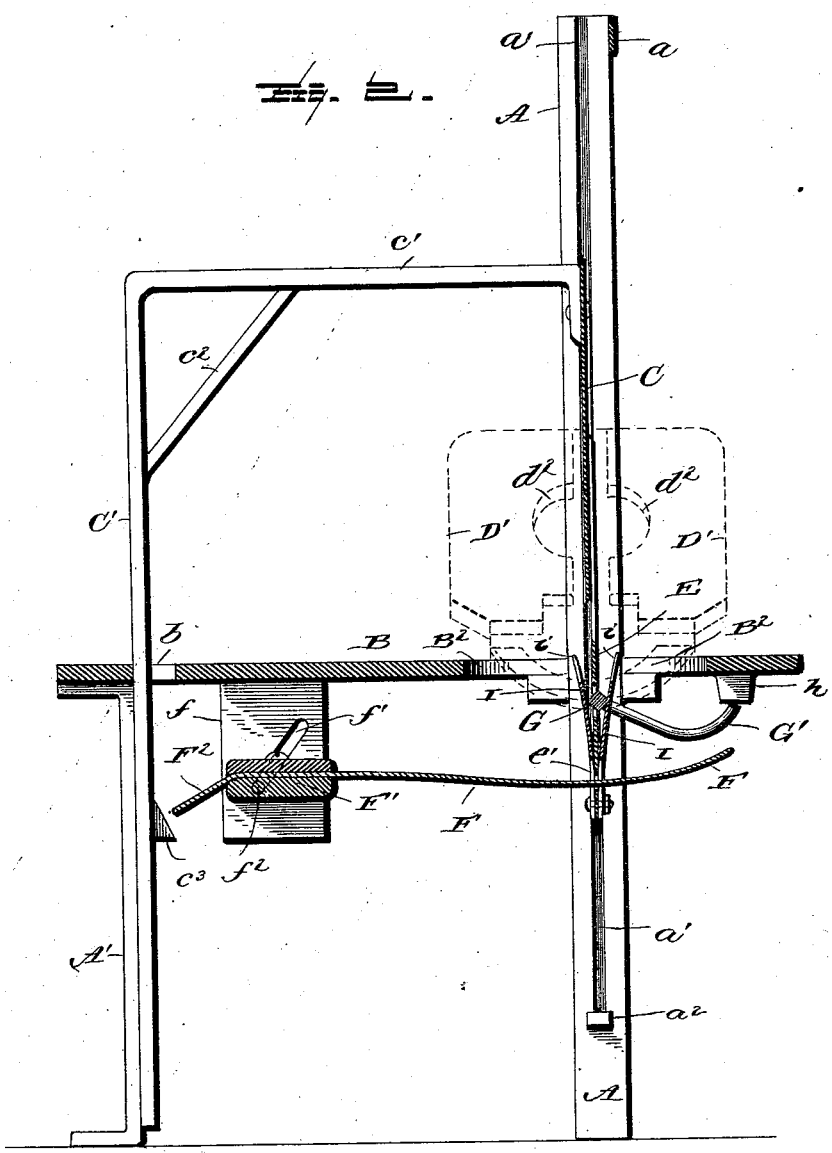

UNITED STATES PATENT OFFICE.

FRANK C. STANIFORD, OF GILROY, ASSIGNOR OF TWO-THIRDS TO DE WITT C. RIDDELL, OF SANTA CRUZ COUNTY, AND JAMES C. ZUCK, OF SANTA CLARA COUNTY, CALIFORNIA.

FRUIT-PITTING MACHINE.

SPECIFICATION forming part of Letters Patent No. 522,627, dated July 10, 1894.

Application filed July 17, 1893. Serial No. 480,754. (No model.)

*To all whom it may concern:*

Be it known that I, FRANK C. STANIFORD, a citizen of the United States, residing at Gilroy, in the county of Santa Clara, State of California, have invented certain new and useful Improvements in Fruit-Pitting Machines, of which the following is a specification, reference being had therein to the accompanying drawings.

This invention relates to certain new and useful improvements in fruit-pitting machines, and it has for its objects among others to provide a device for this purpose which shall be simple in its construction, positive and efficient in its action, of minimum parts and those of such a nature as to be manufactured at slight cost and easily assembled, not liable to get out of order, and the machine as a whole made capable of producing better results and pitting the fruit and separating the halves with no injury thereto, as occurs by some prior machines or devices of this character. I provide means for opening the fruit, the same being operated by the movement of the knives, and automatically returned to their normal position as the knives recede. I provide a hinged or pivoted platform, preferably of yielding or flexible material, mounted for actuation by the movement of the knife to throw the halves of the fruit away from the machine after the same has been split and the pit removed; the platform returns to its normal or horizontal position by gravity. The lower knife is actuated through the medium of the movement of the upper knife. The machine may be arranged to be operated by hand or by steam or other power. The pit is released by the fingers which serve to open the fruit. No attention on the part of the operator is necessary; the fruit is fed to the machine and as the knives reciprocate the fruit is cut in half, the pit released, the halves spread and separated and then thrown from the machine into a suitable receptacle placed in position to receive the same.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a perspective view of my improved fruit-pitting machine. Fig. 2 is a substantially central vertical section from front to rear.

Like letters of reference indicate like parts in both of the views.

Referring now to the details of the drawings by letter, A designates two standards or uprights connected at their upper ends as by a cross-bar $a$ and at their lower ends provided with some suitable means for attachment to a table or base. The opposing faces of these uprights are provided with longitudinal grooves or channels $a'$ for the guidance of the knives; suitable stops as $a^2$ being provided at the lower ends thereof as shown to limit the downward movement of the lower knife.

B is a table or horizontal support which is held at the proper height by suitable means securing it to the uprights A and to a standard A' which is arranged at the end opposite the standards A as shown and which, at its lower end, is provided with some means for its attachment to a table, floor, or base.

C is the upper knife; it is mounted to reciprocate freely in the grooves $a'$ of the uprights A, its lower edge being sharpened as seen at $c$ the operating or acting portion being substantially in the form of an inverted V, as shown in Fig. 1. This knife is attached to the horizontal portion $c'$ of a reciprocatory carrier or arm C' which is mounted to slide through an opening in the end of the table B adjacent to the upright A', a suitable brace arm $c^2$ being provided if necessary to give sufficient rigidity to the horizontal portion to insure the proper movements and retain the parallelism of the knife and its carrier. Motion may be given to this carrier in any suitable manner; by hand, if desired, or otherwise. The carrier or arm C' carries a lug $c^3$ which works through an opening $b$ therefor in the table B, the said lug being inclined or tapered upon its upper face while its lower face is square or horizontal; this lug serves an important function as will be explained later on. To the upper knife, near one edge, there is secured an arm $c^4$ which is bent as at $c^5$ to embrace the upright A as shown in Fig. 1 so as to bring its outer end, which is bent or curved downward, into contact with the tail or extension of the hinged fruit-ejector near the central line thereof.

Opposite the standards A the table B has openings B' for the passage of the knives, and these openings emerge into a substantially circular opening $B^2$ through which the pit is designed to pass after it has been removed from the fruit.

D is the fruit-ejector and supporting platform. It is composed preferably of a curved portion $d$ which is hinged as at $d'$ to the table B or one of the standards A in any suitable manner, the curved portion extending outside the standard as shown in Fig. 1 in the path of and designed to be engaged by the arm $c^4$ as the upper knife is brought down; and to each end of this semi-circular portion there is secured a piece D', preferably of some elastic or yielding substance, each being provided with a semi-circular opening $d^2$ upon their adjacent edges as shown in Fig. 1; these pieces are supported upon the plate or table B over the circular opening therein and each is capable of movement independent of the other when necessary. It will be seen that the preponderance of weight is inside of the hinge so that the normal position of the platform or ejector will be that shown in Fig. 1 to which it returns as soon as the pressure of the arm $c^4$ thereon has been removed. The pieces D' may be detachably held to the part $d$ so as to be easily removed if desired and other plates or pieces with larger or smaller openings substituted therefor, according to the nature of the fruit to be operated upon. These pieces, being yielding, prevent marring of the fruit during the operation of removing the pit.

E is the lower knife; it is mounted to reciprocate in the grooves of the standards A, being limited in its downward movement by the stops $a^2$ as shown in Fig. 1. It is provided with a sharpened acting edge $e$ which is substantially V-shaped as shown in Fig. 1. The knives are mounted to reciprocate in the same channels or grooves and to move simultaneously in opposite directions. Near the lower edge of the lower knife there is an opening $e'$ through which loosely passes one end of the arm F the other end of which after passing in an upwardly-inclined direction, is held in weight or block F' which is mounted to move between the ears or plates $f$ depending from the under side of the table B near the standard A', the said ears or plates having inclined slots $f'$ through which loosely work the laterally projecting portions or pins $f^2$ as shown. The end of the arm F adjacent to the carrier C' is bent to a substantially horizontal plane as seen at $F^2$ and is arranged in the path of and designed to be engaged by the lug $c^3$ on said carrier as the latter is reciprocated.

In a transverse opening $g$ in the lower knife above the opening $e'$ there is mounted a rectangular or polygonal shaft G, the pintles $g'$ of which are held in position in any suitable manner, as by the strips $g^2$ secured to the knife as shown in Fig. 1, the same being mounted so as to readily turn on the pintles and this shaft carries a forwardly-projecting arm G' the free end of which is inclined slightly upward and so arranged as to engage a lug $h$ depending from the under side of the table B near the front end thereof at a predetermined time. Upon opposite sides of this lower knife are the fruit-openers I, each of which consists of a plate of spring material held to the knife at its lower end in any suitable manner and lying flat against the knife as shown with their upper end formed with a substantially V-shaped notch $i$ as seen best in Fig. 1; the shaft G is situated between these spring plates and in its normal condition is within its opening in the knife, but at a predetermined time the shaft is turned and spreads the said plates as will soon be made apparent. This shaft should have its portion between the plates or fingers of a cross section other than circular, and where I refer to said shaft as a "cam-shaft" I intend to cover or include all forms other than circular.

With the parts constructed and arranged substantially as above described the operation is as follows:—The parts are normally in the position in which they are shown in Fig. 1. The fruit is placed upon the platform D' D' and the carrier C' is caused to be moved downward; when the lug $c^3$ on the carrier comes in contact with the horizontal portion of the arm F it moves the same downward and consequently the other end must move upward carrying with it the lower knife; as the knives come together they divide the fruit into halves and in the further movement of the carrier the arm G' comes in contact with the lug $h$ on the under side of the table and turns the shaft G into the position in which it is shown in Fig. 2 which spreads the plates I which had heretofore entered the fruit as the knives were brought together and the halves are thus separated from the pit and when the arm $c^4$ comes in contact with the tail or extension of the platform the latter is thrown upward with a jerk which ejects the fruit and throws it into a receptacle or to any place to one side of the machine; the pit falls through the opening in the table and as the carrier starts on its return stroke the inclined face of the lug $c^3$ comes in contact with the under face of the horizontal portion $F^2$ of the arm F and the said arm is moved thereby toward the front of the machine to permit the said lug to pass, the inclined slots in the plates $f$ being provided for this purpose. As soon as the lug has passed the weight returns the parts to their normal position; as the arm $c^4$ is removed from contact with the curved portion $d$ of the platform the latter returns to its normal position and as the lower knife recedes the arm $G'$ is removed from its engagement with the lug $h$ and the spring of the plates I causes the shaft to return to its normal position and the machine is ready for a repetition of the same operation.

Modifications in detail may be resorted to without departing from the spirit of the invention or sacrificing any of its advantages.

In Fig. 1 there is shown a short tube X which has a vertical or longitudinal slot by which it is held on the lower knife detachably and it has its upper edge sharpened; the object of this tube is to enter the fruit at the stem at which point the pit is attached to the fruit and thereby surround the point of attachment and assist in the removal of the pit; this may be used either alone or in connection with the spreaders.

What I claim as new is—

1. In a fruit pitter, a combined fruit-supporting platform and ejector comprising two pieces of flexible material disconnected throughout their entire length and independently yieldable vertically and laterally, substantially as specified.

2. In a fruit pitter, a combined fruit-supporting platform and ejector comprising two pieces of flexible material disconnected throughout their entire length and mounted upon a pivotal support for independent movement vertically and laterally, substantially as specified.

3. In a fruit pitter, the combination with reciprocating knives and a pivotally-mounted laterally-yielding flexible two-part support and ejector, of devices mounted to operate through the opening between the two parts of the support for separating the halves of the fruit after they have been acted upon by the knives, as set forth.

4. In a fruit pitter, the combination with reciprocating knives and a pivotally-mounted laterally-yielding flexible two-part support and ejector, of devices mounted to operate through the opening between the two parts of the support to separate the severed fruit, and means on one of the knives for separating said devices, substantially as specified.

5. In a fruit pitter, the combination of reciprocating knives, a pivoted support and ejector, spring fingers mounted on one of the knives for separating the pulp from the pit after it has been severed, and a cam shaft mounted to operate between said fingers, substantially as specified.

6. In a fruit pitter, the combination of reciprocating knives, a pivoted support and ejector, spring fingers on one of the knives for separating the severed fruit, a cam shaft mounted to operate between the fingers and an extension on said shaft for actuating the same at a predetermined period, as set forth.

7. In a fruit pitter, the combination of reciprocating knives, a pivoted support and ejector, spring fingers on one of the knives for separating the severed fruit, a cam shaft mounted to operate between the fingers, an extension on said shaft, and means on the table for engaging said extension, substantially as and for the purpose specified.

8. In a fruit pitter, the combination of fruit-severing devices, ejecting mechanism, spreading fingers and a cam shaft mounted for movement between the spreading fingers, as set forth.

9. In a fruit pitter, the combination of reciprocating knives, a pivotally-mounted fruit support and ejector, spring fingers mounted on one of the knives and a cam shaft mounted for movement between said fingers, substantially as specified.

10. In a fruit-pitter, the combination with a reciprocating knife, of spring plates mounted thereon, and a cam shaft mounted in an opening in the knife between said plates and constructed to spread the same, as set forth.

11. In a fruit-pitter, the combination with a reciprocating knife, of spring plates mounted upon opposite sides thereof, a shaft mounted between the plates and means actuated by the reciprocation of the other knife to cause said shaft to spread the plates, as and for the purpose specified.

12. In a fruit-pitter, the combination with the reciprocating knives, of spring plates mounted on one of the knives, a shaft located between the plates, an arm on said shaft and co-operating device on the table, substantially as specified.

13. In a fruit-pitter, the combination with the reciprocating knives, of the pivotally-mounted flexible platform of two independently movable parts in the same horizontal plane and having a tail, and an arm on one of the knives to engage said tail, as set forth.

14. In a fruit-pitter, the combination with reciprocating knives, of a pivotally-mounted fruit-support and ejector having two independently-movable parts of yielding material in the same horizontal plane, as set forth.

15. In a fruit-pitter, the combination with the upper and lower knives, of the carrier for the upper knife, the arm having one end loosely held on the lower knife, and its other end arranged in the path of means on the carrier, substantially as specified.

16. In a fruit-pitter, the combination with the lower knife, and the carrier of the upper knife having a lug with inclined upper face, of the arm having one end passed loosely through an opening in the lower knife, with its other end arranged in the path of said lug, and a block on said arm having projections working in inclined slots in plates depending from the table, substantially as specified.

17. In a fruit-pitter, the combination of the upper and lower knives, the carrier with its lug, the arm on the upper knife, the pivoted fruit-support and ejector, with a tail arranged in the path of said arm, the plates depending from the table and having inclined slots, the block having lateral pins working in said slots, and the arm having one end passed loosely through the lower knife and its other end held in said block and arranged in the path of the lug on the carrier, substantially as specified.

18. In a fruit-pitter, spring fruit-separating plates having V-shaped upper ends and movable with one of the knives to separate the fruit after it has been acted upon by the knives, and a cam shaft mounted to move between said plates, substantially as specified.

19. In a fruit-pitter, spring fruit-separating plates movable with one of the knives, combined with a cam shaft movably mounted between said plates on said knife for separating the plates, as set forth.

20. In a fruit-pitter, spring fruit-separating plates movable with one of the knives, combined with a table with transverse opening, and a cam-shaft movably mounted on said knife co-operating with means on the table for spreading said plates, substantially as specified.

21. In a fruit-pitter, the combination with the lower knife, and the spring fingers on said knife, of a tube detachably mounted on said knife between the fingers and having a sharpened upper edge, as and for the purpose specified.

In testimony whereof I affix my signature in presence of two witnesses.

FRANK C. STANIFORD.

Witnesses:
H. S. SCOTT,
GEO. T. DUNLAP.